United States Patent
Zeng (10) Patent No.: US 11,688,329 B2
(45) Date of Patent: Jun. 27, 2023

(54) TEMPERATURE CONTROL METHOD, TEMPERATURE CONTROL APPARATUS, AND STORAGE MEDIUM

(71) Applicant: BEIJING XIAOMI MOBILE SOFTWARE CO., LTD., Beijing (CN)

(72) Inventor: Fankang Zeng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/522,814

(22) Filed: Nov. 9, 2021

(65) Prior Publication Data

US 2022/0375393 A1 Nov. 24, 2022

(30) Foreign Application Priority Data

May 21, 2021 (CN) .......................... 202110560091.4

(51) Int. Cl.
G09G 3/20 (2006.01)
(52) U.S. Cl.
CPC ....... *G09G 3/2096* (2013.01); *G09G 2310/08* (2013.01); *G09G 2320/041* (2013.01); *G09G 2320/043* (2013.01); *G09G 2330/021* (2013.01); *G09G 2340/0435* (2013.01); *G09G 2360/18* (2013.01); *G09G 2370/02* (2013.01)

(58) Field of Classification Search
None
See application file for complete search history.

(56) References Cited

U.S. PATENT DOCUMENTS 9,612,880 B1 * 4/2017 Hedley .................. G06F 1/206

FOREIGN PATENT DOCUMENTS

EP 3786935 A 3/2021
WO 2014197565 A1 12/2014

* cited by examiner

*Primary Examiner* — Christopher J Kohlman
(74) *Attorney, Agent, or Firm* — Arch & Lake LLP (57) ABSTRACT

A temperature control method is provided. In the method, a terminal determines a current temperature of the terminal and determines, based on a preset corresponding relationship between a screen display frame rate and a temperature interval, a target temperature interval of the current temperature of the terminal in the preset corresponding relationship. The terminal may determine a target screen display frame rate corresponding to the target temperature interval. And the terminal may adjust a current screen display frame rate of the terminal to the target screen display frame rate, to control the temperature of the terminal to be within a preset temperature range.

15 Claims, 6 Drawing Sheets

TEMPERATURE CONTROL METHOD, TEMPERATURE CONTROL APPARATUS, AND STORAGE MEDIUM

CROSS-REFERENCE TO RELATED APPLICATION

This application is based upon and claims priority to Chinese Application No. 202110560091.4, filed on May 21, 2021, the entire content of which is incorporated herein by reference for all purposes.

BACKGROUND

With the continuous development of terminal technology, high frame rates have become a trend in the development of display technology, and the frame rates supported by terminals are increasingly high. The high frame rates bring users a smooth screen display and a faster touch response experience, but also put forward higher requirements for the power consumption of terminals, and cause temperature rise of the terminals when terminal loads are high.

In order to ensure the safety of a terminal, temperature control is required when its temperature rises, for example, reducing CPU frequency and the like.

SUMMARY

The disclosure relates to the field of terminal technology, in particular to a temperature control method, a temperature control apparatus, and a storage medium.

According to a first aspect of the disclosure, a temperature control method is provided, applied to a terminal, the temperature control method including: determining a current temperature of the terminal; determining, based on a preset corresponding relationship between a screen display frame rate and a temperature interval, a target temperature interval of the current temperature of the terminal in the preset corresponding relationship, and determining a target screen display frame rate corresponding to the target temperature interval; and adjusting a current screen display frame rate of the terminal to the target screen display frame rate, to control the temperature of the terminal to be within a preset temperature range.

According to a second aspect of the disclosure, a temperature control apparatus is provided, including: a processor; and a memory for storing processor executable instructions; the processor is configured to execute a temperature control method, the method including: determining a current temperature of the terminal; determining, based on a preset corresponding relationship between a screen display frame rate and a temperature interval, a target temperature interval of the current temperature of the terminal in the preset corresponding relationship, and determining a target screen display frame rate corresponding to the target temperature interval; and adjusting a current screen display frame rate of the terminal to the target screen display frame rate, to control the temperature of the terminal to be within a preset temperature range.

According to a third aspect of the disclosure, a non-temporary computer-readable storage medium is provided. When instructions in the storage medium are executed by a processor of a terminal, the terminal can execute a temperature control method, the method including: determining a current temperature of the terminal; determining, based on a preset corresponding relationship between a screen display frame rate and a temperature interval, a target temperature interval of the current temperature of the terminal in the preset corresponding relationship, and determining a target screen display frame rate corresponding to the target temperature interval; and adjusting a current screen display frame rate of the terminal to the target screen display frame rate, to control the temperature of the terminal to be within a preset temperature range.

It should be understood that the above general description and the following detailed description are merely exemplary and explanatory, and should not limit the present invention.

BRIEF DESCRIPTION OF THE DRAWINGS

Accompanying drawings here, which are incorporated in and constitute a part of this specification, illustrate examples consistent with the present disclosure and, together with the description, serve to explain principles of the present disclosure.

DETAILED DESCRIPTION

When the following descriptions refer to the drawings, the same numbers in different drawings indicate the same or similar elements, unless otherwise indicated. The implementation manners described in the following examples do not represent all implementation manners consistent with the disclosure. Instead, they are merely examples of apparatuses and methods consistent with some aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

With the advancement of science and technology and the improvement of living standards, the configuration levels of terminals are increasingly high, and people use terminals more and more to meet various requirements in work and life. As the frame rates supported by the terminals are increasingly high, the power consumption increases inevitably during use.

When a high-load application, such as a game application, is running in a terminal, it continuously runs in a high-frequency processor. As a result, the temperature of the terminal increases over time, which not only affects user's temperature experience during use, but also affects the service life of the terminal due to over-temperature. In the current technology, the temperature is lowered by reducing CPU frequency, but the reduction of CPU frequency will degrade terminal performance, and the degradation of performance will make the terminal unable to support high frame rates, which will cause frame rate fluctuations and crash of user's current application display screen to affect user experience.

The disclosure provides a temperature control method, a temperature control apparatus, and a storage medium. By monitoring a current temperature of a terminal and adjusting a current screen display frame rate based on a corresponding relationship between a screen display frame rate and a temperature interval, the impact of temperature changes can be reduced, a relatively high frame rate can be maintained, and crash can be reduced.

Figure 1:
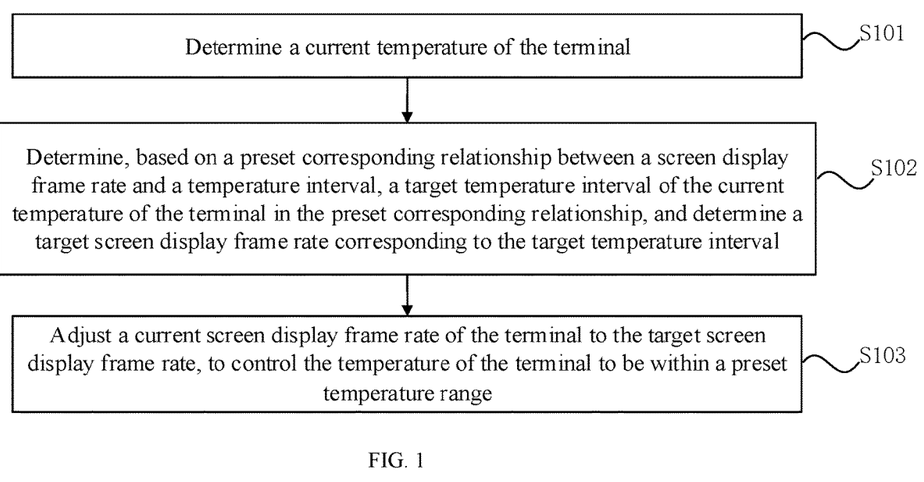
FIG. 1 is a flowchart of a temperature control method according to one or more examples of the disclosure.

FIG. 1 is a flowchart of a temperature control method according to some examples. The temperature control method is applied to a terminal, which may be a mobile phone, a tablet, a personal business assistant, a notebook, etc. As shown in FIG. 1, the temperature control method includes the following steps.

In step S101, a current temperature of the terminal is determined.

In step S102, based on a preset corresponding relationship between a screen display frame rate and a temperature interval, a target temperature interval of the current temperature of the terminal in the preset corresponding relationship is determined, and a target screen display frame rate corresponding to the target temperature interval is determined.

In step S103, a current screen display frame rate of the terminal is adjusted to the target screen display frame rate, to control the temperature of the terminal to be within a preset temperature range.

In the example of the disclosure, when the terminal runs an application or is powered on, the current temperature of the terminal may be determined by a temperature sensor configured in the terminal. The determination of the current temperature of the terminal may be real-time acquisition or periodic acquisition of the overall temperature of the terminal. The overall temperature of the terminal can be used to characterize the current temperature of the terminal.

In the example of the disclosure, if an application is running on the terminal, the current screen display frame rate of the terminal may be the one corresponding to the display of related content of the application. The current screen display frame rate of the application is a speed of display screen change that can be perceived by a user when the application is running on the terminal, that is, a frequency at which bitmap images viewed by human eyes in frame units continuously appear on a monitor or a screen when the user uses the application. There is a preset corresponding relationship between a screen display frame rate and a temperature interval, and the preset corresponding relationship between the screen display frame rate and the temperature interval may be preset according to the configuration and usage of the terminal. The temperature interval is determined based on the tolerance of the human body to temperature. For example, the temperature interval may be determined based on the degree of comfort when the human body uses the terminal, and, to ensure the safe use of the terminal, other temperature intervals are determined based on the material and performance of the terminal. It is understandable that the corresponding relationship between the screen display frame rate and the temperature interval may be preset in the terminal, and therefore, the preset corresponding relationship corresponding to each user is the same; the corresponding relationship between the screen display frame rate and the temperature interval may also be set according to actual situations of different users, and therefore, the preset corresponding relationship corresponding to different users may be different, for example, the preset corresponding relationship corresponding to users of different age groups is different.

The target temperature interval of the current temperature of the terminal is determined based on the current temperature of the terminal, and the target screen display frame rate corresponding to the target temperature interval is determined. The current screen display frame rate is adjusted to the target screen display frame rate, to control the temperature of the terminal to be within a preset temperature range. The preset temperature range may be a temperature range less than or equal to the current temperature of the terminal. Understandably, the reduction of the current screen display frame rate can reduce the refresh rate of display content on a display, reduce the frequency of CPU and GPU of the terminal, reduce the power consumption of the terminal, and reduce heat generation, and the lower the frame rate is, the lower the power consumption is. Therefore, the temperature of the terminal can be adjusted by reducing the current screen display frame rate of the terminal.

In some examples, when the temperature of the terminal is effectively controlled and lowered, the current screen display frame rate can be increased on the current basis and adjusted to the target screen display frame rate higher than the current screen display frame rate to improve the display effect of the terminal.

According to the example of the disclosure, the current temperature of the terminal is determined, the target screen display frame rate corresponding to the current temperature is determined based on the preset corresponding relationship between the screen display frame rate and the temperature interval, and the current screen display frame rate of the terminal is adjusted to the target screen display frame rate, which can maintain the stability of the frame rate and reduce the display crash of the terminal during the temperature control of the terminal.

Figure 2:
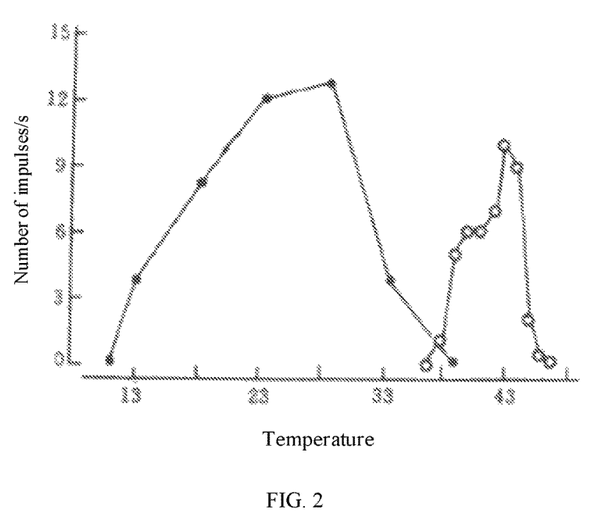
FIG. 2 is a schematic diagram of an impulse frequency relationship of the human body with temperature changes according to one or more examples of the disclosure.

FIG. 2 is a schematic diagram of an impulse frequency relationship of the human body with temperature changes according to some examples of the disclosure. Referring to FIG. 2, it can be seen that as the temperature increases, the human body has the maximum impulse frequency in a high temperature stage, that is, when the temperature reaches 43° C.

In the example of the disclosure, the skin layer of the human body senses outside temperature changes, and the human body generates impulses when stimulated by cold and heat and sends pulse signals to the brain. The strength of a signal is determined by the frequency of a pulse, the frequency of the pulse is an impulse frequency, and the impulse frequency changes with temperature stimulus. Based on the sensitivity of human body to temperatures and its tolerance to high temperatures, the temperature point corresponding to the maximum impulse frequency of the human body is determined as a first temperature threshold, that is, when the first temperature threshold is reached, the current screen display frame rate is reduced to reduce the temperature of the terminal, so as to prevent the temperature of the terminal from entering the temperature interval where the human body is prone to impulse. In addition, for the metal body material of the terminal, the temperature point to ensure the safe use of the terminal is a second temperature threshold. That is, during continuous use of the terminal to run the application, when the terminal generates heat and the temperature rises to the second temperature threshold, the frame rate is further reduced to control the temperature rise and ensure the use safety of the terminal.

In the example of the disclosure, there is a preset corresponding relationship between a screen display frame rate and a temperature interval. For different applications, the corresponding relationship between the screen display frame rate and the temperature interval may be the same or different. The first temperature threshold and the second temperature threshold are determined based on the tolerance of the human body to temperatures, the second temperature threshold being greater than the first temperature threshold. The temperature interval includes a first temperature interval, a second temperature interval, and a third temperature interval. The upper temperature limit of the first temperature interval is the first temperature threshold, the lower temperature limit of the second temperature interval is the second temperature threshold, the third temperature interval takes the first temperature threshold as the lower limit and the second temperature threshold value as the upper limit, and the third temperature interval includes a plurality of continuous temperature sub-intervals. It should be noted that there is no intersection between the first temperature interval, the second temperature interval, and the third temperature interval, that is, if the first temperature interval includes the first temperature threshold, the third temperature interval does not include the first temperature threshold; if the first temperature interval does not include the first temperature threshold, the third temperature interval includes the first temperature threshold; if the second temperature interval includes the second temperature threshold, the third temperature interval does not include the second temperature threshold; if the second temperature interval does not include the second temperature threshold, the third temperature interval includes the second temperature threshold.

The first temperature interval corresponds to a first screen display frame rate, the second temperature interval corresponds to a second screen display frame rate, the third temperature interval includes a plurality of continuous temperature sub-intervals, and each temperature sub-interval has a corresponding relationship with a third screen display frame rate, that is, each temperature sub-interval has a corresponding third screen display frame rate. The second screen display frame rate is smaller than the first screen display frame rate, and the third screen display frame rate is between the first screen display frame rate and the second screen display frame rate. It is understandable that the higher the temperature value included in the temperature sub-interval is, the lower the corresponding third screen display frame rate is.

For example, table 1 shows the preset corresponding relationship between the temperature interval and the screen display frame rate.

TABLE 1

| Temperature interval (° C.) | <43 | 43~45 | 46~47 | 48 | 49~50 | >50 |
|---|---|---|---|---|---|---|
| Display frame rate | X1 | X2 | X3 | X4 | X5 | X6 |

Taking Table 1 as an example, the preset first temperature threshold is 43° C., the second temperature threshold is 48° C., and the first temperature interval, that is, the temperature lower than 43° C. corresponds to the first screen display frame rate X1. The second temperature interval, that is, the temperature interval higher than 48° C., corresponds to the second screen display frame rate X5. The third temperature interval between 43° C. and 48° C. can be divided into temperature sub-intervals according to the use requirements of the terminal, that is, divided into a plurality of sub-intervals. For example, 43° C.~45° C. is divided into a sub-interval corresponding to the screen display frame rate X2, 46° C.~47° C. is divided into a sub-interval corresponding to the screen display frame rate X3, and 48° C. is divided into a sub-interval corresponding to the screen display frame rate X4. The second temperature interval may also be divided into sub-intervals, that is, temperatures below 50° C. and above 50° C. are divided again, respectively corresponding to the screen display frame rate X5 and the screen display frame rate X6. In Table 1, the values of the screen display frame rates X1, X2 . . . X6 may be determined according to the actual use requirements of the terminal, and the values of X1, X2 . . . X6 gradually decrease. For the screen display frame rate X2 corresponding to the first temperature threshold 43° C., X2 is more reduced than the first screen display frame rate X1 corresponding to the first temperature interval. For the screen display frame rate X4 corresponding to the second temperature threshold 48° C., X4 is more reduced than the third screen display frame rate X3 corresponding to the temperature sub-interval 46° C.~47° C., so that when the temperature reaches the first temperature threshold or the second temperature threshold, the temperature can be effectively controlled by controlling the current screen display frame rate. It should be noted that Table 1 is not a limitation on the preset corresponding relationship between the temperature interval and the screen display frame rate. In other examples, the screen display frame rate corresponding to (0, 42.5° C.] may also be set to X1, and the screen display frame rate corresponding to (42.5° C., 47° C.] may be set to X2.

According to the example of the disclosure, the temperature threshold is determined based on the tolerance of the human body to temperature, the temperature interval is divided based on the temperature threshold, different temperature intervals correspond to different screen display frame rates, and the comfortable temperature perceived by the human body and the safe use temperature of terminal materials for the human body are comprehensively measured, which prevents the human body from being in a high temperature interval to cause emotional impulse and discomfort, realizes the display of different temperature intervals in different screen display frame rates, lowers the temperature of the terminal, and maintains the stability of the frame rate.

Figure 3:
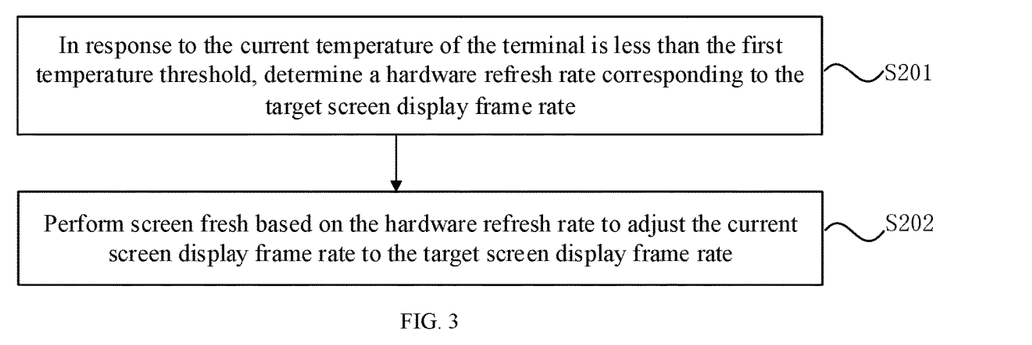
FIG. 3 is a flowchart of a method for adjusting a current screen display frame rate of a terminal to a target screen display frame rate according to one or more examples of the disclosure.

FIG. 3 is a flowchart of a method for adjusting the current screen display frame rate of the terminal to the target screen display frame rate according to some examples of the disclosure. As shown in FIG. 3, the method for adjusting the current screen display frame rate of the terminal to the target screen display frame rate includes the following steps.

In step S201, in response to the current temperature of the terminal is less than the first temperature threshold, a hardware refresh rate corresponding to the target screen display frame rate is determined.

In step S202, screen refresh is performed based on the hardware refresh rate to adjust the current screen display frame rate to the target screen display frame rate.

In the example of the disclosure, the current screen display frame rate is comprehensively determined by an intersection of a refresh rate of terminal hardware and a frame rate demand of an application, and the frame rate demand of the application is usually greater than the refresh rate of the terminal hardware. Therefore, the current screen display frame rate of the terminal can be adjusted by controlling the refresh rate of the terminal hardware. For example, the frame rate demand of the application is 90 frames per second, the refresh rate of the terminal hardware is 50 frames per second, and the current screen display frame rate of the application can be displayed at 50 frames per second, that is, the actual display frame rate that can be viewed by the user is 50 frames per second.

In the example of the disclosure, when the current temperature of the terminal is less than the first temperature threshold, the terminal is in a normal temperature stage, and the current screen display frame rate is adjusted to the target screen display frame rate to control the temperature of the terminal not to exceed the first temperature threshold, so that the user feels a suitable temperature when using the terminal. The control on the hardware refresh rate has a stable effect of controlling the screen display frame rate, that is, the screen display frame rate of the terminal can be adjusted by controlling the hardware refresh rate of the terminal. The current temperature of the terminal is determined, the target screen display frame rate corresponding to the current temperature is determined based on the preset corresponding relationship between the screen display frame rate and the temperature interval, and the terminal is controlled to display at the target screen display frame rate.

In the example of the disclosure, when the terminal performs image display, that is, performs screen display, the CPU or GPU generates an image in a buffer, the screen fetches the image from the buffer, and displays the image after refreshing. The refresh of the screen includes horizontal refresh from left to right for each line and vertical refresh from top to bottom. After a screen refresh cycle is completed, a vertical synchronization (VSync) signal is sent to enter a short refresh blank period. The VSync signal is generated by a hwcomposer (HWC) hardware module according to the screen refresh rate. When the VSync signal is generated, a copy operation of display data is completed. After the copy operation is completed, the CPU or GPU is notified to draw a next frame of image. After the copy operation is completed, the screen starts the next refresh cycle, that is, the data just copied is displayed on the screen for screen display. That is, when the VSync signal is generated, the CPU/GPU starts drawing, which keeps the display frame rate and the refresh frequency synchronous. The hardware refresh rate is a refresh frequency of the VSync signal generated by the HWC module, and the current screen display frame rate is adjusted by controlling the hardware refresh rate of the HWC module. Understandably, the value of the determined hardware refresh rate is equal to the value of the target screen display frame rate, that is, the target screen display frame rate is used as the hardware refresh rate for hardware refresh, so as to adjust the current screen display frame rate of the terminal to the target screen display frame rate.

According to the example of the disclosure, when the current temperature of the terminal is less than the first temperature threshold, it is determined that the terminal is refreshed at the target screen display frame rate, and the effect of controlling the screen display frame rate of the terminal is more stable and effective.

Figure 4:
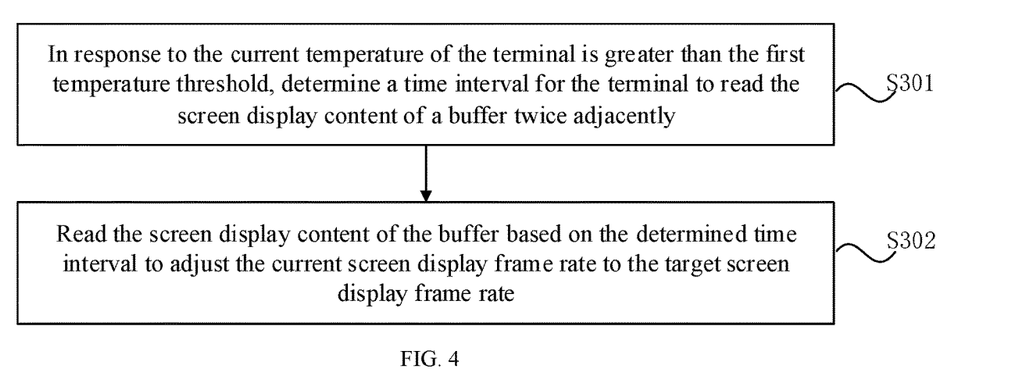
FIG. 4 is a flowchart of a method for adjusting a current screen display frame rate of a terminal to a target screen display frame rate according to one or more examples of the disclosure.

FIG. 4 is a flowchart of a method for adjusting the current screen display frame rate of the terminal to the target screen display frame rate according to some examples of the disclosure. As shown in FIG. 4, the method for adjusting the current screen display frame rate of the terminal to the target screen display frame rate includes the following steps.

In step S301, in response to the current temperature of the terminal is greater than the first temperature threshold, a time interval for the terminal to read the screen display content of a buffer twice adjacently is determined.

In step S302, the screen display content of the buffer is read based on the determined time interval to adjust the current screen display frame rate to the target screen display frame rate.

In the example of the disclosure, the current temperature of the terminal is determined, the target screen display frame rate corresponding to the current temperature is determined based on the preset corresponding relationship between the screen display frame rate and the temperature interval, and the terminal is controlled to display at the target screen display frame rate as the current screen display frame rate, for example, display the related content of the application currently running on the terminal at the target screen display frame rate. The terminal reads the screen display content of the buffer, displays the read screen display content to complete the display and refresh of a frame of screen image, continues to read the screen display content of a next frame of screen image in the buffer, and so on. The time interval for the terminal to read the screen display content of the buffer twice adjacently is the time it takes to refresh each frame of screen. Understandably, the time it takes to refresh each frame of screen is a reciprocal of the screen display frame rate. Since different temperature intervals correspond to different screen display frame rates, the current screen display frame rate of the terminal can be adjusted by determining the time interval for the terminal to read the screen display content of the buffer twice adjacently, and the current screen display frame rate can be adjusted to the target screen display frame rate to dynamically stabilize frames. When the current temperature is greater than the first temperature threshold, that is, the temperature of the terminal rises significantly and is in a high temperature interval, the time it takes for the terminal to refresh each frame of screen is determined, that is, the target screen display frame rate is determined, so as to adjust the current screen display frame rate of the terminal to the target screen display frame rate.

According to the example of the disclosure, if the current temperature of the terminal is greater than the first temperature threshold, that is, as the heat generation increases, the temperature rises, and the terminal is in a high temperature stage, the current screen display frame rate of the terminal is adjusted to the target screen display frame rate, to control the temperature of the terminal not to exceed the second temperature threshold, so as to ensure the use safety of the terminal. The time interval for the terminal to read the screen display content of the buffer twice adjacently is determined, and the current screen display frame rate is adjusted to the target screen display frame rate, which ensures that the duration of the target screen display frame rate is stable, and controls the temperature of the terminal to be within the preset temperature range by reducing the current screen display frame rate of the terminal in the high temperature stage.

It should be noted that when the current temperature of the terminal is equal to the first temperature threshold, the current screen display frame rate of the terminal can be adjusted by steps S201 and S202, and the current screen display frame rate of the terminal can also be adjusted by steps S301 and S302.

Figure 5:
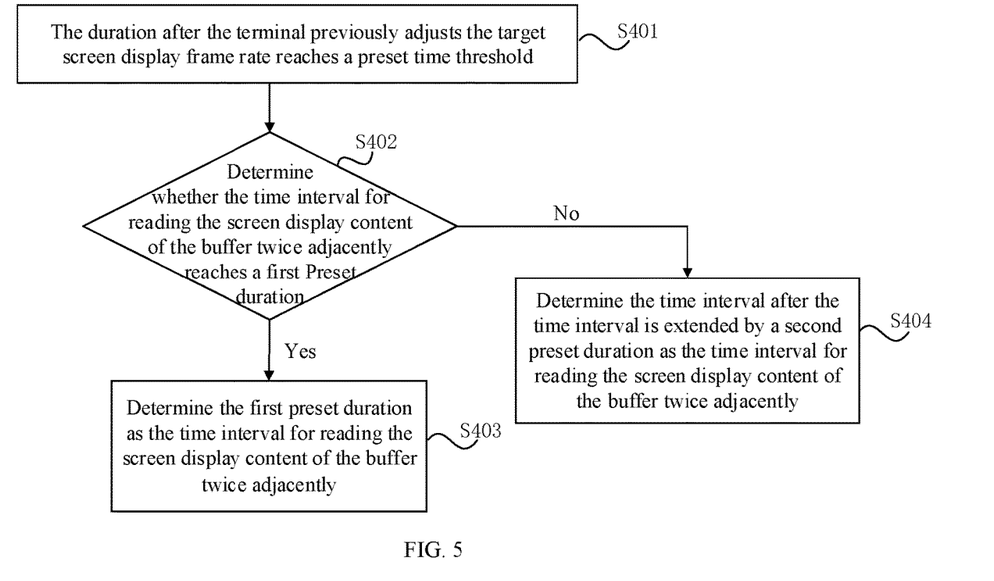
FIG. 5 is a flowchart of a method for determining a time interval for the terminal to read the screen display content of a buffer twice adjacently according to one or more examples of the disclosure.

FIG. 5 is a flowchart of a method for determining the time interval for the terminal to read the screen display content of the buffer twice adjacently according to some examples of the disclosure. As shown in FIG. 5, the method for determining the time interval for the terminal to read the screen display content of the buffer twice adjacently includes the following steps.

In step S401, the duration after the terminal previously adjusts the target screen display frame rate reaches a preset time threshold.

In step S402, whether the time interval for reading the screen display content of the buffer twice adjacently reaches a first preset duration is determined. Step S403 is performed if it is determined that the time interval for reading the screen display content of the buffer twice adjacently reaches the first preset duration, or step S404 is performed if it is determined that the time interval for reading the screen display content of the buffer twice adjacently does not reach the first preset duration.

In step S403, the first preset duration is determined as the time interval for reading the screen display content of the buffer twice adjacently.

In step S404, the time interval after the time interval extended by a second preset duration is determined as the time interval for reading the screen display content of the buffer twice adjacently.

In the example of the disclosure, the terminal reads the screen display content of the buffer to display the read screen display content and complete the display and refresh of a frame of screen image, and continues to read the screen display content of a next frame of screen image in the buffer, and the time interval for the terminal to read the screen display content of the buffer twice adjacently is the time it takes to refresh each frame of screen. Understandably, the time it takes to refresh each frame of screen is a reciprocal of the screen display frame rate. Since different temperature intervals correspond to different screen display frame rates, the current screen display frame rate can be adjusted to the target screen display frame rate by determining the time interval for the terminal to read the screen display content of the buffer twice adjacently. If the current temperature of the terminal is greater than the first temperature threshold, that is, as the heat generation increases, the temperature rises, and the terminal is in a high temperature stage, the current screen display frame rate is adjusted to the target screen display frame rate, to control the temperature of the terminal not to exceed the second temperature threshold, so as to ensure the use safety of the terminal. The previous adjustment of the target screen display frame rate by the terminal is determined, and the duration after the adjustment reaches a preset time threshold. The preset time threshold may be set by the user to be greater than or equal to the reciprocal of the target screen display frame rate. The increase in the preset time threshold can extend the adjustment period for adjusting the current screen display frame rate. It can also be understood that the preset time threshold is a polling time for obtaining the temperature of the terminal, that is, when the time after adjusting the target screen display frame rate reaches the preset time threshold at the current temperature, the temperature of the terminal is obtained again to determine the current screen display frame rate of the terminal when the temperature changes. When the time interval between the time when the terminal finishes reading the screen display content of the buffer and the time when finishing reading the screen display content of the buffer previously reaches the first preset duration, that is, the value of the time it takes for the terminal to refresh each frame of screen is equal to the reciprocal of the target screen display frame rate value, the first preset duration is determined as the time interval for the terminal to read the screen display content of the buffer twice adjacently, and the current screen display frame rate of the terminal is the target screen display frame rate.

When the time interval between the time when the terminal finishes reading the screen display content of the buffer and the time when finishing reading the screen display content of the buffer previously does not reach the first preset duration, that is, the value of the time it takes for the terminal to refresh each frame of screen is smaller than the reciprocal of the target screen display frame rate value, the time interval after the time interval extended by a second preset duration is determined as the time interval for reading the screen display content of the buffer twice adjacently. The time interval for the terminal to read the screen display content of the buffer twice adjacently is extended by the second preset duration, which is a duration difference between the first preset duration and the time interval for reading the screen display content of the buffer twice adjacently, so that the time interval extended by the second preset duration corresponds to the current screen display frame rate of the terminal, that is, the target screen display frame rate.

According to the example of the disclosure, if the current temperature of the terminal is greater than the first temperature threshold, the time interval for the terminal to read the screen display content of the buffer twice adjacently is determined, and the current screen display frame rate is adjusted to the target screen display frame rate, which ensures that the duration of the target screen frame rate is stable, and controls the temperature of the terminal to be within the preset temperature range by reducing the target screen display frame rate in the high temperature stage.

Figure 6:
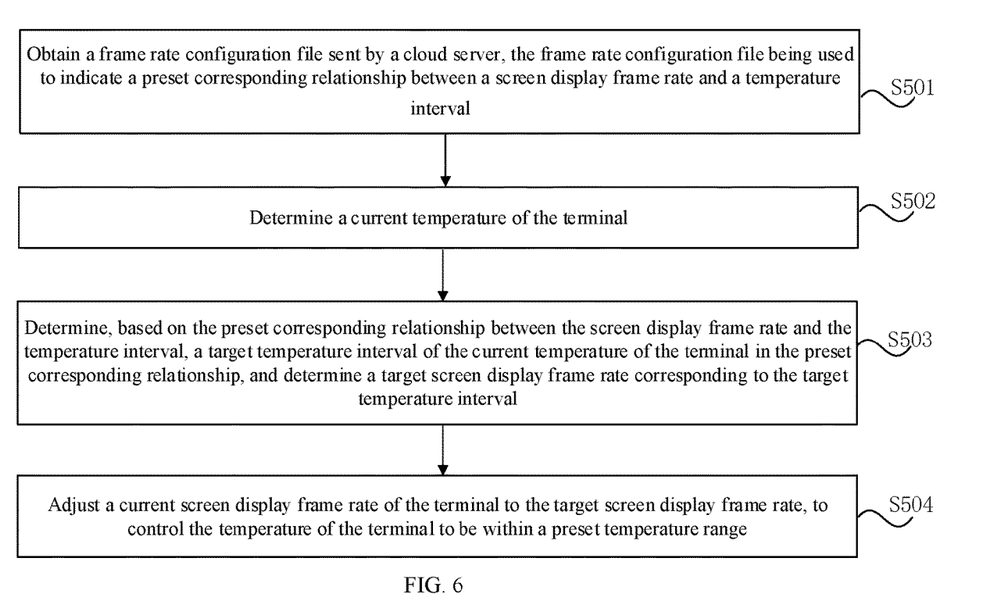
FIG. 6 is a flowchart of a temperature control method according to one or more examples of the disclosure.

FIG. 6 is a flowchart of a temperature control method according to some examples of the disclosure. As shown in FIG. 6, the temperature control method includes the following steps.

In step S501, a frame rate configuration file sent by a cloud server is obtained, the frame rate configuration file being used to indicate a preset corresponding relationship between a screen display frame rate and a temperature interval.

In step S502, a current temperature of the terminal is determined.

In step S503, based on a preset corresponding relationship between a screen display frame rate and a temperature interval, a target temperature interval of the current temperature of the terminal in the preset corresponding relationship is determined, and a target screen display frame rate corresponding to the target temperature interval is determined.

In step S504, a current screen display frame rate of the terminal is adjusted to the target screen display frame rate, to control the temperature of the terminal to be within a preset temperature range.

In the example of the disclosure, a current temperature of the terminal is determined, there is a corresponding relationship between a screen display frame rate of the terminal and a temperature interval, and the corresponding relationship between the screen display frame rate of the terminal and the temperature interval may be preset according to the configuration and usage of the terminal. The corresponding relationship between the screen display frame rate and the temperature interval may be configured by the cloud server. The terminal obtains the frame rate configuration file sent by the cloud server, the frame rate configuration file being used to indicate the preset corresponding relationship between the screen display frame rate and the temperature interval. The frame rate configuration file may be predetermined and saved in the cloud server, and the configuration file may also be updated according to use requirements.

In the example of the disclosure, the terminal synchronizes with the cloud server, and receives the frame rate configuration file sent by the cloud server, the frame rate configuration file corresponding to the version number of the terminal on a one-to-one basis. The terminal analyzes the received frame rate configuration file to obtain the corresponding relationship between the temperature interval and the screen display frame rate value of the terminal. The target temperature interval of the current temperature is determined based on the current temperature of the terminal, and the target screen display frame rate corresponding to the target temperature interval is determined. The current screen display frame rate of the terminal is adjusted to the target screen display frame rate, to control the temperature of the terminal to be within a preset temperature range.

According to the example of the disclosure, the current temperature of the terminal is monitored, the frame rate configuration file sent by the cloud server is obtained, the preset corresponding relationship between the screen display frame rate of the terminal and the temperature interval is determined, the target screen display frame rate corresponding to the current temperature is determined, and the current screen display frame rate of the terminal is adjusted to the target screen display frame rate, which can maintain the stability of the frame rate and reduce display crash during the temperature control of the terminal.

Figure 7:
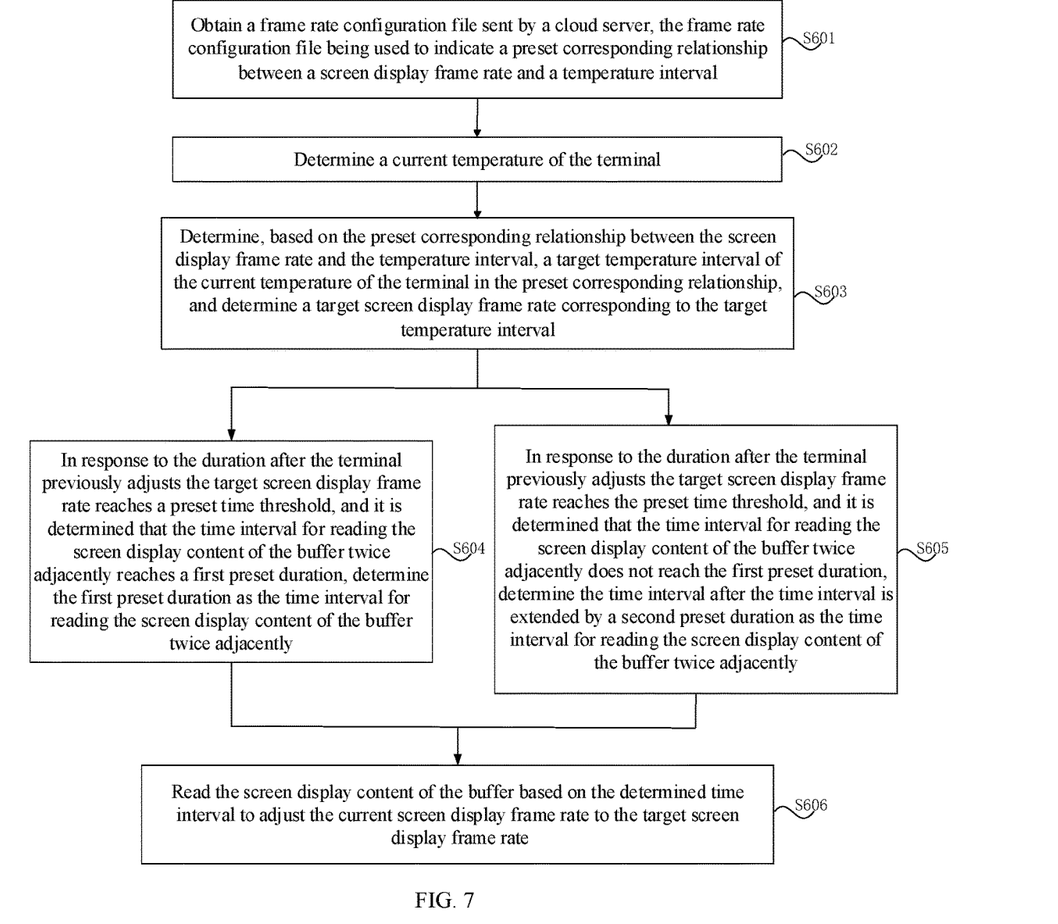
FIG. 7 is a flowchart of a temperature control method according to one or more examples of the disclosure.

FIG. 7 is a flowchart of a temperature control method according to some examples of the disclosure. As shown in FIG. 7, the temperature control method includes the following steps.

In step S601, a frame rate configuration file sent by a cloud server is obtained, the frame rate configuration file being used to indicate a preset corresponding relationship between a screen display frame rate and a temperature interval.

In step S602, a current temperature of the terminal is determined.

In step S603, a target temperature interval of the current temperature of the terminal in the preset corresponding relationship is determined based on the preset corresponding relationship between the screen display frame rate and the temperature interval, and a target screen display frame rate corresponding to the target temperature interval is determined.

In step S604, in response to the duration after the terminal previously adjusts the target screen display frame rate reaches a preset time threshold, and it is determined that the time interval for reading the screen display content of a buffer twice adjacently reaches a first preset duration, the first preset duration is determined as the time interval for reading the screen display content of the buffer twice adjacently.

In step S605, in response to the duration after the terminal previously adjusts the target screen display frame rate reaches the preset time threshold, and it is determined that the time interval for reading the screen display content of the buffer twice adjacently does not reach the first preset duration, the time interval after the time interval is extended by a second preset duration is determined as the time interval for reading the screen display content of the buffer twice adjacently.

In step S606, the screen display content of the buffer is read based on the determined time interval to adjust the current screen display frame rate to the target screen display frame rate.

In the example of the disclosure, the terminal synchronizes with the cloud server, and receives the frame rate configuration file sent by the cloud server. The terminal analyzes the received frame rate configuration file to obtain the corresponding relationship between the temperature interval and the screen display frame rate value of the terminal. The target temperature interval of the current temperature of the terminal is determined based on the current temperature of the terminal, and the target screen display frame rate corresponding to the target temperature interval is determined.

In the example of the disclosure, the terminal reads the screen display content of the buffer to display the read screen display content and complete the display and refresh of a frame of screen image, and continues to read the screen display content of a next frame of screen image in the buffer, and the time interval for the terminal to read the screen display content of the buffer twice adjacently is the time it takes to refresh each frame of screen. If the current temperature of the terminal is greater than the first temperature threshold, that is, as the heat generation increases, the temperature rises, and the terminal is in a high temperature stage, the current screen display frame rate of the terminal is adjusted to the target screen display frame rate, to control the temperature of the terminal not to exceed the second temperature threshold, so as to ensure the use safety of the terminal. The current screen display frame rate can be adjusted to the target screen display frame rate by determining the time interval for the terminal to read the screen display content of the buffer twice adjacently, to dynamically stabilize frames. The previous adjustment of the target screen display frame rate by the terminal is determined, and the duration after the adjustment reaches a preset time threshold. The preset time threshold may be set by the user to be greater than or equal to the reciprocal of the target screen display frame rate. The increase in the preset time threshold can extend the adjustment period for adjusting the current screen display frame rate of the terminal. Understandably, the preset time threshold is a polling time for obtaining the temperature of the terminal, that is, a time interval for obtaining the temperature of the terminal again when the duration after the target screen display frame rate of the terminal is adjusted once at the current temperature reaches the preset time threshold. When the time interval between the time when the terminal finishes reading the screen display content of the buffer and the time when finishing reading the screen display content of the buffer previously reaches the first preset duration, that is, the value of the time it takes for the terminal to refresh each frame of screen is equal to the reciprocal of the target screen display frame rate value, the first preset duration is determined as the time interval for the terminal to read the screen display content of the buffer twice adjacently, and the current screen display frame rate of the terminal is the target screen display frame rate.

When the time interval between the time when the terminal finishes reading the screen display content of the buffer and the time when finishing reading the screen display content of the buffer previously does not reach the first preset duration, that is, the value of the time it takes for the terminal to refresh each frame of screen is smaller than the reciprocal of the target screen display frame rate value, the time interval after the time interval extended by a second preset duration is determined as the time interval for reading the screen display content of the buffer twice adjacently. The time interval for the terminal to read the screen display content of the buffer twice adjacently is extended by the second preset duration, which is a duration difference between the first preset duration and the time interval for reading the screen display content of the buffer twice adjacently, so that the time interval extended by the second preset duration corresponds to the current screen display frame rate of the terminal, that is, the target screen display frame rate.

According to the example of the disclosure, if the current temperature of the terminal is greater than the first temperature threshold, the time interval for the terminal to read the screen display content of the buffer twice adjacently is determined, and the current screen display frame rate is adjusted to the target screen display frame rate, which ensures that the duration of the frame rate at the target screen frame rate is stable, and maintains the stability of the screen display frame rate during the temperature control in the high temperature stage.

Figure 8:
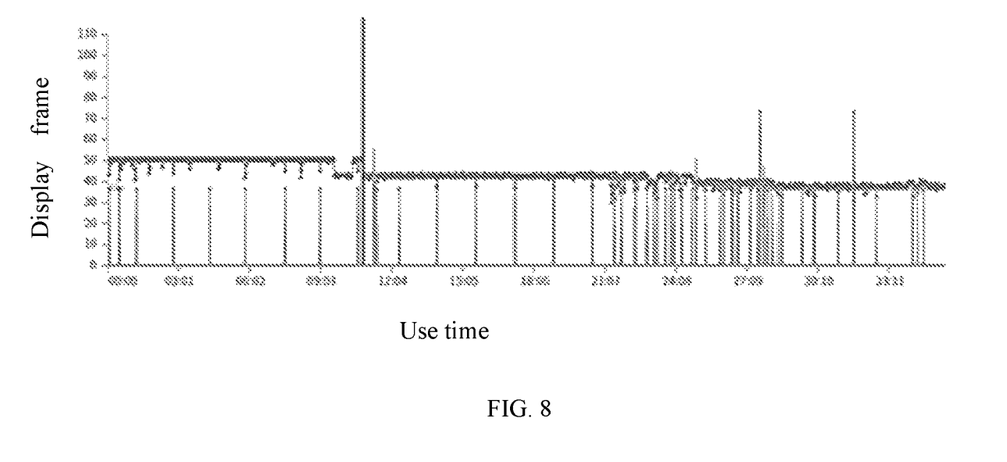
FIG. 8 is an effect diagram of application of the temperature control method according to one or more examples of the disclosure.

FIG. 8 is an effect diagram of application of the temperature control method according to some examples of the disclosure. Referring to FIG. 8, when the temperature control method shown in the example of the disclosure is applied to a game application with a high terminal running load, the temperature rise of the terminal is effectively controlled (not shown), the human body feels comfortable, and during the game, with the change of time, the current screen display frame rate of the terminal is stable without jitter. At about 9 minutes, the current screen display frame rate is stably maintained at about 50 frames. At about 11 seconds, the current screen display frame rate is maintained at a stable value. At about 25 seconds, the current screen display frame rate is maintained about another frame rate value. That is, by applying the temperature control method of the example of the disclosure, as time changes and temperature increases, although the current screen display frame rate of the terminal drops slightly, the overall change is stable, which improves user experience.

Based on the same concept, an example of the disclosure further provides a temperature control apparatus.

It can be understood that the apparatus provided in the example of the disclosure is to implement the above-mentioned functions, and includes hardware structures and/or software modules for executing corresponding functions. In conjunction with the units and algorithm steps of the examples disclosed in the disclosure, the example of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the examples of the disclosure.

Figure 9:
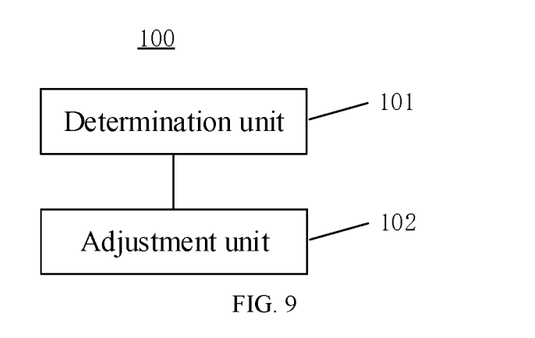
FIG. 9 is a block diagram of a temperature control apparatus according to one or more examples of the disclosure.

FIG. 9 is a block diagram of a temperature control apparatus according to some examples of the disclosure. The temperature control apparatus is applied to a terminal. Referring to FIG. 9, the temperature control apparatus 100 includes a determination unit 101 and an adjustment unit 102.

The determination unit 101 is configured to determine a current temperature of the terminal, determine, based on a preset corresponding relationship between a screen display frame rate and a temperature interval, a target temperature interval of the current temperature of the terminal in the preset corresponding relationship, and determine a target screen display frame rate corresponding to the target temperature interval.

The adjustment unit 102 is configured to adjust a current screen display frame rate of the terminal to the target screen display frame rate, to control the temperature of the terminal to be within a preset temperature range.

In some examples, the preset corresponding relationship between the screen display frame rate and the temperature interval includes at least one of the following corresponding relationships: a corresponding relationship between a first temperature interval and a first screen display frame rate; a corresponding relationship between a second temperature interval and a second screen display frame rate; and a corresponding relationship between each temperature sub-interval among a plurality of consecutive temperature sub-intervals included in a third temperature interval and a third screen display frame rate. The upper temperature limit of the first temperature interval is a first temperature threshold, the lower temperature limit of the second temperature interval is a second temperature threshold, and the third temperature interval takes the first temperature threshold as the lower limit and the second temperature threshold as the upper limit. The second temperature threshold is greater than the first temperature threshold, the second screen display frame rate is less than the first screen display frame rate, and the third screen display frame rate is between the first screen display frame rate and the second screen display frame rate.

In some examples, the adjustment unit 102 adjusts the current screen display frame rate of the terminal to the target screen display frame rate in the following way: if the current temperature of the terminal is less than the first temperature threshold, a hardware refresh rate corresponding to the target screen display frame rate is determined; and screen fresh is performed based on the hardware refresh rate to adjust the current screen display frame rate to the target screen display frame rate.

In some examples, the adjustment unit 102 adjusts the current screen display frame rate of the terminal to the target screen display frame rate in the following way: if the current temperature of the terminal is greater than the first temperature threshold, a time interval for the terminal to read the screen display content of a buffer twice adjacently is determined; and the screen display content of the buffer is read based on the determined time interval to adjust the current screen display frame rate to the target screen display frame rate.

In some examples, the adjustment unit 102 determines the time interval for the terminal to read the screen display content of a buffer twice adjacently in the following way: if the duration after the terminal previously adjusts the target screen display frame rate reaches a preset time threshold, and it is determined that the time interval for reading the screen display content of the buffer twice adjacently reaches a first preset duration, the first preset duration is determined as the time interval for reading the screen display content of the buffer twice adjacently; or if the duration after the terminal previously adjusts the target screen display frame rate reaches the preset time threshold, and it is determined that the time interval for reading the screen display content of the buffer twice adjacently does not reach the first preset duration, the time interval after the time interval is extended by a second preset duration is determined as the time interval for reading the screen display content of the buffer twice adjacently, the second preset duration being a duration difference between the first preset duration and the time interval for reading the screen display content of the buffer twice adjacently.

Figure 10:
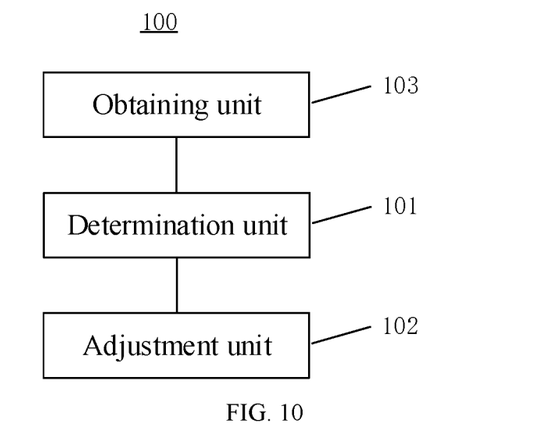
FIG. 10 is a block diagram of a temperature control apparatus according to one or more examples of the disclosure.

FIG. 10 is a block diagram of a temperature control apparatus according to some examples of the disclosure. Referring to FIG. 10, the temperature control apparatus 100 further includes an obtaining unit 103.

The obtaining unit 103 is configured to obtain a frame rate configuration file sent by a cloud server, the frame rate configuration file being used to indicate a preset corresponding relationship between a screen display frame rate and a temperature interval.

With regard to the apparatus in the above example, the specific manners that the respective modules perform the operations have been described in detail in the example relating to the method, and will not be explained in detail herein.

Figure 11:
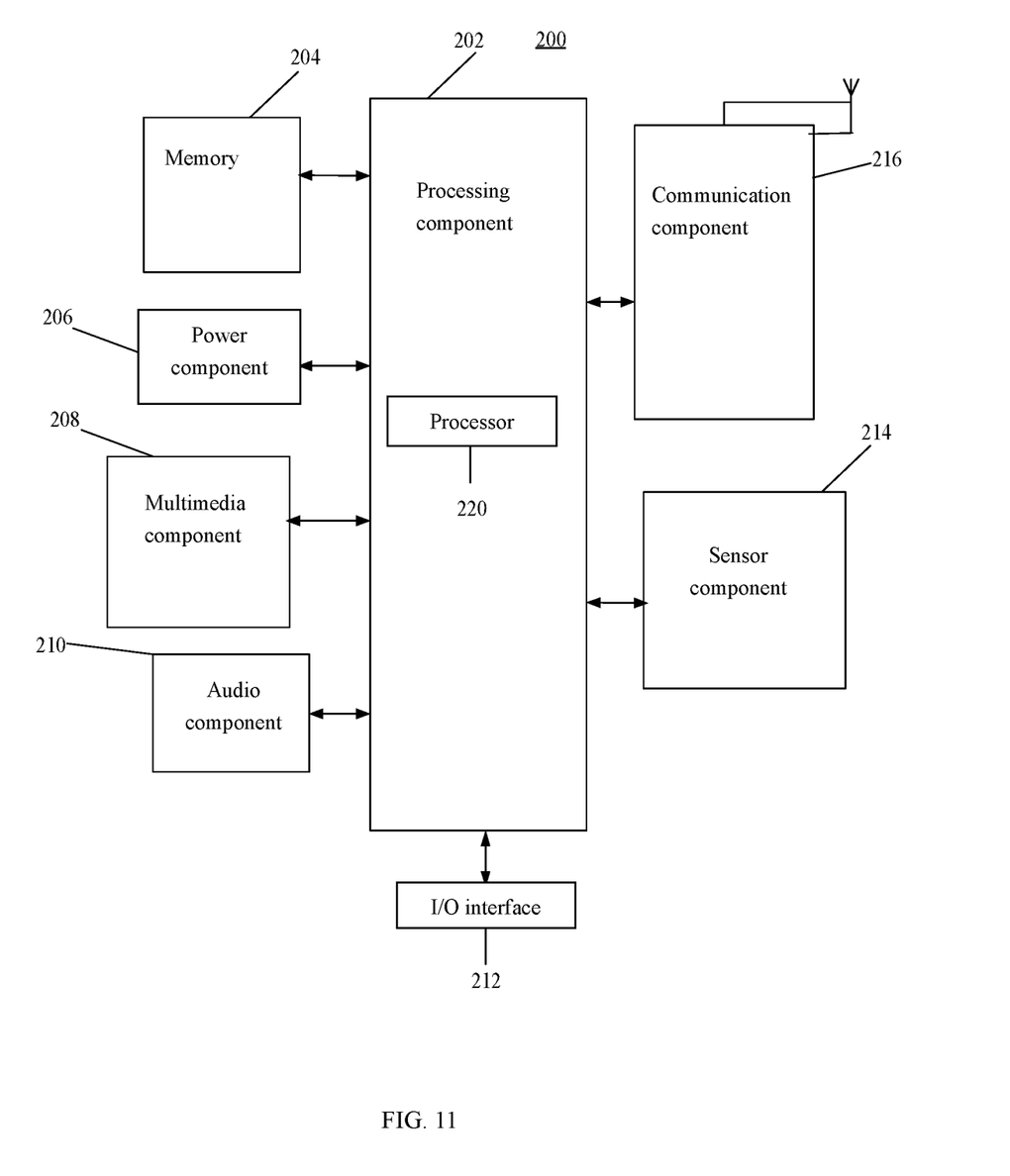
FIG. 11 is a block diagram of a device for temperature control according to one or more examples of the disclosure.

FIG. 11 is a block diagram of a device 200 for temperature control according to some examples of the disclosure. For example, the device 200 may be a mobile phone, a computer, a digital broadcasting terminal, a messaging device, a game console, a tablet device, a medical device, a fitness device, a personal digital assistant, etc.

Referring to FIG. 11, the device 200 may include one or more of the following components: a processing component 202, a memory 204, a power component 206, a multimedia component 208, an audio component 210, an input/output (I/O) interface 212, a sensor component 214, and a communication component 216.

The processing component 202 usually controls the overall operations of the device 200, such as operations associated with display, telephone call, data communication, camera operation and recording operation. The processing component 202 may include one or more processors 220 to execute instructions to complete all of or part of the steps of the above method. Moreover, the processing component 202 may include one or more modules to facilitate interaction between the processing component 202 and other components. For example, the processing component 202 may include a multimedia module to facilitate interaction between the multimedia component 208 and the processing component 202.

The memory 204 is configured to store various types of data to support operations at the device 200. Examples of these data include instructions for any application or method operated on the device 200, contact data, phone book data, messages, pictures, videos, etc. The memory 204 may be implemented by any type of volatile or non-volatile storage device or a combination thereof, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 206 supplies power to various components of the device 200. The power component 206 may include a power management system, one or more power sources, and other components associated with power generation, management and distribution of the device 200.

The multimedia component 208 includes a screen for providing an output interface between the device 200 and the user. In an implementation manner, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In an implementation manner, the multimedia component 208 includes a front camera and/or a rear camera. When the device 200 is in an operation mode, such as a shooting mode or a video mode, the front camera and/or the rear camera can receive external multimedia data. Each front or rear camera may be a fixed optical lens system or have focal length and optical zoom capability.

The audio component 210 is configured to output and/or input audio signals. For example, the audio component 210 includes a microphone (MIC), which is configured to receive external audio signals when the device 200 is in an operational mode, such as a call mode, a recording mode and a voice recognition mode. The received audio signals may be further stored in the memory 204 or sent by the communication component 216. In an implementation manner, the audio component 210 further includes a speaker for outputting audio signals.

The I/O interface 212 provides an interface between the processing component 202 and a peripheral interface module. The peripheral interface module may be a keyboard, a click wheel, a button, etc. The button may include but is not limited to a home button, a volume button, a start button and a lock button.

The sensor component 214 includes one or more sensors for providing various aspects of status assessment for the device 200. For example, the sensor component 214 may detect the on/off state of the device 200, and relative positions of components such as a display and a keypad of the device 200. The sensor component 214 may also detect a position change of the device 200 or one component of the device 200, presence or absence of contact between the user and the device 200, an orientation or acceleration/deceleration of the device 200 and a temperature change of the device 200. The sensor component 214 may include a proximity sensor configured to detect the presence of nearby objects without any physical contact. The sensor component 214 may also include an optical sensor, such as a CMOS or CCD image sensor, for use in imaging applications. In an implementation manner, the sensor component 214 may also include an acceleration sensor, a gyro sensor, a magnetic sensor, a pressure sensor, or a temperature sensor.

The communication component 216 is configured to facilitate wired or wireless communication between the device 200 and other devices. The device 200 may access a wireless network based on communication standards, such as WiFi, 2G or 3G, or a combination thereof. In some examples, the communication component 216 receives broadcast signals or broadcast associated information from an external broadcast management system via a broadcast channel. In some examples, the communication component 216 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In some examples, the device 200 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In some examples, a non-temporary computer-readable storage medium including instructions is further provided, such as a memory 204 including instructions executable by the processor 220 of the electronic equipment 200 to complete the above method. For example, the non-temporary computer-readable storage medium may be an ROM, a random access memory (RAM), a CD-ROM, a magnetic tape, a floppy disk, an optical data storage device, etc.

It can be understood that "plurality" in the disclosure refers to two or more than two, and other quantifiers are similar. "And/or" describes an association relationship of associated objects, indicating three relationships, for example, A and/or B may indicate that A exists alone, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first", "second", etc. are used to describe a variety of information, but the information should not be limited to these terms. These terms are merely used to distinguish the same type of information from each other, and do not indicate a specific order or degree of importance. In fact, the expressions such as "first" and "second" can be used interchangeably. For example, without departing from the scope of the disclosure, the first information may also be referred to as second information, and similarly, the second information may also be referred to as first information.

It can be further understood that, unless otherwise specified, "connected" includes a direct connection between the two without other components, and also includes an indirect connection between the two with other elements.

It can be further understood that although the operations in the examples of the disclosure are described in a specific order in the drawings, they should not be understood as being performed in the specific order shown or in a serial order, or being all performed to obtain desired results. In certain circumstances, multitasking and parallel processing may be advantageous.

Those skilled in the art would readily conceive of other examples of the disclosure after considering the specification and practicing the disclosure herein. The present application is intended to cover any variations, uses or adaptive changes of the disclosure. These variations, uses or adaptive changes follow the general principle of the disclosure and include common general knowledge or conventional technical means in the technical field that are not disclosed in the disclosure. The description and the examples are merely regarded as exemplary, and the real scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A temperature control method, comprising:
   determining, by a terminal, a current temperature of the terminal;
   determining, by the terminal based on a preset corresponding relationship between a screen display frame rate and a temperature interval, a target temperature interval of the current temperature of the terminal in the preset corresponding relationship, and determining a target screen display frame rate corresponding to the target temperature interval;
   obtaining a frame rate configuration file sent by a cloud server, the frame rate configuration file being used to indicate the preset corresponding relationship between the screen display frame rate and the temperature interval; and
   adjusting, by the terminal, a current screen display frame rate of the terminal to the target screen display frame rate, to control the temperature of the terminal to be within a preset temperature range.

2. The temperature control method according to claim 1, wherein the preset corresponding relationship between the screen display frame rate and the temperature interval comprises:
   a corresponding relationship between a first temperature interval and a first screen display frame rate;

a corresponding relationship between a second temperature interval and a second screen display frame rate; or
a corresponding relationship between each temperature sub-interval among a plurality of consecutive temperature sub-intervals comprised in a third temperature interval and a third screen display frame rate;
wherein the upper temperature limit of the first temperature interval is a first temperature threshold, the lower temperature limit of the second temperature interval is a second temperature threshold, and the third temperature interval takes the first temperature threshold as a lower limit and the second temperature threshold as an upper limit; and
wherein the second temperature threshold is greater than the first temperature threshold, the second screen display frame rate is less than the first screen display frame rate, and the third screen display frame rate is between the first screen display frame rate and the second screen display frame rate.

3. The temperature control method according to claim 2, wherein adjusting the current screen display frame rate of the terminal to the target screen display frame rate comprises:
in response to the current temperature of the terminal is less than the first temperature threshold, determining a hardware refresh rate corresponding to the target screen display frame rate; and
performing screen fresh based on the hardware refresh rate to adjust the current screen display frame rate to the target screen display frame rate.

4. The temperature control method according to claim 2, wherein adjusting the current screen display frame rate of the terminal to the target screen display frame rate comprises:
in response to the current temperature of the terminal is greater than the first temperature threshold, determining a time interval for the terminal to read the screen display content of a buffer twice adjacently; and
reading the screen display content of the buffer based on the determined time interval to adjust the current screen display frame rate to the target screen display frame rate.

5. The temperature control method according to claim 4, wherein determining the time interval for the terminal to read the screen display content of the buffer twice adjacently comprises:
in response to a duration after the terminal previously adjusts the target screen display frame rate reaches a preset time threshold, and it is determined that the time interval for reading the screen display content of the buffer twice adjacently reaches a first preset duration, determining the first preset duration as the time interval for reading the screen display content of the buffer twice adjacently; or
in response to the duration after the terminal previously adjusts the target screen display frame rate reaches the preset time threshold, and it is determined that the time interval for reading the screen display content of the buffer twice adjacently does not reach the first preset duration, determining the time interval after the time interval is extended by a second preset duration as the time interval for reading the screen display content of the buffer twice adjacently;
wherein the second preset duration is a duration difference between the first preset duration and the time interval for reading the screen display content of the buffer twice adjacently.

6. A temperature control apparatus, comprising:
at least one processor; and
a memory for storing processor executable instructions;
wherein, the at least one processor is configured to execute a temperature control method, the method comprising:
determining a current temperature of the terminal;
determining, based on a preset corresponding relationship between a screen display frame rate and a temperature interval, a target temperature interval of the current temperature of the terminal in the preset corresponding relationship, and determining a target screen display frame rate corresponding to the target temperature interval;
obtaining a frame rate configuration file sent by a cloud server, the frame rate configuration file being used to indicate the preset corresponding relationship between the screen display frame rate and the temperature interval; and
adjusting a current screen display frame rate of the terminal to the target screen display frame rate, to control the temperature of the terminal to be within a preset temperature range.

7. The temperature control apparatus according to claim 6, wherein the preset corresponding relationship between the screen display frame rate and the temperature interval comprises:
a corresponding relationship between a first temperature interval and a first screen display frame rate;
a corresponding relationship between a second temperature interval and a second screen display frame rate; or
a corresponding relationship between each temperature sub-interval among a plurality of consecutive temperature sub-intervals comprised in a third temperature interval and a third screen display frame rate;
wherein the upper temperature limit of the first temperature interval is a first temperature threshold, the lower temperature limit of the second temperature interval is a second temperature threshold, and the third temperature interval takes the first temperature threshold as a lower limit and the second temperature threshold as an upper limit; and
wherein the second temperature threshold is greater than the first temperature threshold, the second screen display frame rate is less than the first screen display frame rate, and the third screen display frame rate is between the first screen display frame rate and the second screen display frame rate.

8. The temperature control apparatus according to claim 7, wherein adjusting the current screen display frame rate of the terminal to the target screen display frame rate comprises:
in response to the current temperature of the terminal is less than the first temperature threshold, determining a hardware refresh rate corresponding to the target screen display frame rate; and
performing screen fresh based on the hardware refresh rate to adjust the current screen display frame rate to the target screen display frame rate.

9. The temperature control apparatus according to claim 7, wherein adjusting the current screen display frame rate of the terminal to the target screen display frame rate comprises:
in response to the current temperature of the terminal is greater than the first temperature threshold, determining a time interval for the terminal to read the screen display content of a buffer twice adjacently; and reading the screen display content of the buffer based on the determined time interval to adjust the current screen display frame rate to the target screen display frame rate.

10. The temperature control apparatus according to claim 9, wherein determining the time interval for the terminal to read the screen display content of the buffer twice adjacently comprises:
in response to a duration after the terminal previously adjusts the target screen display frame rate reaches a preset time threshold, and it is determined that the time interval for reading the screen display content of the buffer twice adjacently reaches a first preset duration, determining the first preset duration as the time interval for reading the screen display content of the buffer twice adjacently; or
in response to the duration after the terminal previously adjusts the target screen display frame rate reaches the preset time threshold, and it is determined that the time interval for reading the screen display content of the buffer twice adjacently does not reach the first preset duration, determining the time interval after the time interval is extended by a second preset duration as the time interval for reading the screen display content of the buffer twice adjacently;
wherein the second preset duration is a duration difference between the first preset duration and the time interval for reading the screen display content of the buffer twice adjacently.

11. A non-temporary computer-readable storage medium, wherein instructions are stored in the storage medium, and when the instructions in the storage medium are executed by at least one processor of a terminal, the terminal performs a temperature control method, the method comprising:
determining a current temperature of the terminal;
determining, based on a preset corresponding relationship between a screen display frame rate and a temperature interval, a target temperature interval of the current temperature of the terminal in the preset corresponding relationship, and determining a target screen display frame rate corresponding to the target temperature interval;
obtaining a frame rate configuration file sent by a cloud server, the frame rate configuration file being used to indicate the preset corresponding relationship between the screen display frame rate and the temperature interval; and
adjusting a current screen display frame rate of the terminal to the target screen display frame rate, to control the temperature of the terminal to be within a preset temperature range.

12. The non-temporary computer-readable storage medium according to claim 11, wherein the preset corresponding relationship between the screen display frame rate and the temperature interval comprises:
a corresponding relationship between a first temperature interval and a first screen display frame rate;
a corresponding relationship between a second temperature interval and a second screen display frame rate; or
a corresponding relationship between each temperature sub-interval among a plurality of consecutive temperature sub-intervals comprised in a third temperature interval and a third screen display frame rate;
wherein the upper temperature limit of the first temperature interval is a first temperature threshold, the lower temperature limit of the second temperature interval is a second temperature threshold, and the third temperature interval takes the first temperature threshold as a lower limit and the second temperature threshold as an upper limit; and
wherein the second temperature threshold is greater than the first temperature threshold, the second screen display frame rate is less than the first screen display frame rate, and the third screen display frame rate is between the first screen display frame rate and the second screen display frame rate.

13. The non-temporary computer-readable storage medium according to claim 12, wherein adjusting the current screen display frame rate of the terminal to the target screen display frame rate comprises:
in response to the current temperature of the terminal is less than the first temperature threshold, determining a hardware refresh rate corresponding to the target screen display frame rate; and
performing screen fresh based on the hardware refresh rate to adjust the current screen display frame rate to the target screen display frame rate.

14. The non-temporary computer-readable storage medium according to claim 12, wherein adjusting the current screen display frame rate of the terminal to the target screen display frame rate comprises:
in response to the current temperature of the terminal is greater than the first temperature threshold, determining a time interval for the terminal to read the screen display content of a buffer twice adjacently; and
reading the screen display content of the buffer based on the determined time interval to adjust the current screen display frame rate to the target screen display frame rate.

15. The non-temporary computer-readable storage medium according to claim 14, wherein determining the time interval for the terminal to read the screen display content of the buffer twice adjacently comprises:
in response to a duration after the terminal previously adjusts the target screen display frame rate reaches a preset time threshold, and it is determined that the time interval for reading the screen display content of the buffer twice adjacently reaches a first preset duration, determining the first preset duration as the time interval for reading the screen display content of the buffer twice adjacently; or
in response to the duration after the terminal previously adjusts the target screen display frame rate reaches the preset time threshold, and it is determined that the time interval for reading the screen display content of the buffer twice adjacently does not reach the first preset duration, determining the time interval after the time interval is extended by a second preset duration as the time interval for reading the screen display content of the buffer twice adjacently;
wherein the second preset duration is a duration difference between the first preset duration and the time interval for reading the screen display content of the buffer twice adjacently.

* * * * *